(12) United States Patent
Sharma et al.

(10) Patent No.: US 11,934,678 B2
(45) Date of Patent: Mar. 19, 2024

(54) DATA REDUCTION FOR STORAGE VOLUMES

(71) Applicant: HEWLETT PACKARD ENTERPRISE DEVELOPMENT LP, Houston, TX (US)

(72) Inventors: Manu Sharma, Karnataka (IN); Sudheer Vanapalli, Karnataka (IN); Jaffer Sherif Rajasab, Karnataka (IN); Gautam Kaistha, Karnataka (IN); Manoj Srivatsav, Karnataka (IN); Mayukh Dutta, Karnataka (IN)

(73) Assignee: Hewlett Packard Enterprise Development LP, Spring, TX (US)

( * ) Notice: Subject to any disclaimer, the term of this patent is extended or adjusted under 35 U.S.C. 154(b) by 10 days.

(21) Appl. No.: 17/814,420

(22) Filed: Jul. 22, 2022

(65) Prior Publication Data
US 2024/0028233 A1 Jan. 25, 2024

(51) Int. Cl.
*G06F 3/06* (2006.01)

(52) U.S. Cl.
CPC .......... *G06F 3/0641* (2013.01); *G06F 3/0608* (2013.01); *G06F 3/0631* (2013.01); *G06F 3/0679* (2013.01)

(58) Field of Classification Search
CPC ...... G05B 13/00–048; G05B 15/00–02; G05B 17/00–02; G06F 1/00–3296; G06F 3/00; G06F 3/06–0689; G06F 5/00–16; G06F 8/00–78; G06F 9/00–548; G06F 11/00–3696; G06F 12/00–16; G06F 13/00–4295; G06F 15/00–825; G06F 16/00–986; G06F 18/00–41; G06F 17/00–40; G06F 21/00–88; G06F 2009/3883; G06F 2009/45562–45595;
(Continued)

(56) References Cited

U.S. PATENT DOCUMENTS 9,564,918 B2 * 2/2017 Asher ................ H03M 7/4037
10,120,601 B2 * 11/2018 Matsushita ............ G06F 3/065
(Continued)

OTHER PUBLICATIONS

ZFS: To Dedupe or Not to Dedupe . . . ; Gonzalez, Constantin; Jul. 27, 2011; retrieved from https://constantin.glez.de/2011/07/27/zfs-to-dedupe-or-not-dedupe/ on Sep. 25, 2023 (Year: 2011).*
(Continued)

*Primary Examiner* — Daniel C. Chappell
(74) *Attorney, Agent, or Firm* — Trop, Pruner & Hu, P.C.

(57) ABSTRACT

In some examples, a system identifies resource contention for a resource in a storage system, and determines that a workload collection that employs data reduction is consuming the resource. The system identifies relative contributions to consumption of the resource attributable to storage volumes in the storage system, where the workload collection that employs data reduction are performed on data of the storage volumes. The system determines whether storage space savings due to application of the data reduction for a given storage volume of the storage volumes satisfy a criterion, and in response to determining that the storage space savings for the given storage volume do not satisfy the criterion, the system indicates that the data reduction is not to be applied for the given storage volume.

20 Claims, 5 Drawing Sheets

(58) Field of Classification Search
CPC ...... G06F 2015/761–768; G06F 2201/00–885;
G06F 2206/00–20; G06F 2209/00–549;
G06F 2211/00–902; G06F 2212/00–7211;
G06F 2213/00–4004; G06F 2216/00–17;
G06F 2221/00–2153; G06N 3/00–126;
G06N 5/00–048; G06N 7/00–08; G06N
10/00; G06N 20/00–20; G06N
99/00–007; G06T 1/00–60; G06V
30/00–43; G11B 20/00–24; G11B
33/00–1493; G11C 11/00–5692; G11C
13/00–06; G11C 14/00–009; G11C
15/00–06; G11C 16/00–3495; G11C
17/00–18; G11C 2207/00–229; G11C
2216/00–30; H01L 25/00–50; H01L
2225/00–1094; H03M 7/00–707; H04L
9/00–38; H04L 12/00–66; H04L
41/00–5096; H04L 49/00–9094; H04L
61/00–59; H04L 67/00–75
See application file for complete search history.

(56) References Cited

U.S. PATENT DOCUMENTS

| | | | |
|---|---|---|---|
| 10,282,125 B2 * | 5/2019 | Korondi | G06F 3/0674 |
| 10,296,229 B2 * | 5/2019 | Sawa | G06F 3/0608 |
| 10,521,122 B2 * | 12/2019 | Abe | G06F 3/0665 |
| 10,521,399 B1 * | 12/2019 | Ben-Tsion | G06F 3/0608 |
| 10,592,110 B2 | 3/2020 | Camp et al. | |
| 10,732,884 B1 * | 8/2020 | Gupta | G06F 3/0647 |
| 11,061,571 B1 * | 7/2021 | Krishnamurthy | G06F 12/0895 |
| 11,422,737 B2 * | 8/2022 | Ryu | G06F 3/0608 |
| 11,442,627 B2 * | 9/2022 | Kawase | G06F 3/064 |
| 11,467,734 B2 * | 10/2022 | Song | G06F 3/0673 |
| 2006/0074918 A1 * | 4/2006 | Nakatsuka | G06F 3/0613 |
| 2017/0371593 A1 | 12/2017 | Li et al. | |
| 2021/0216239 A1 * | 7/2021 | Dutta | G06F 3/0655 |
| 2023/0066251 A1 * | 3/2023 | Trim | H04W 28/0263 |
| 2023/0409198 A1 * | 12/2023 | Zhou | G06F 3/067 |

OTHER PUBLICATIONS

P. -T. Huang, I. -C. Wu, C. -Y. Lo and W. Hwang, "Energy-Efficient Accelerator Design With Tile-Based Row-Independent Compressed Memory for Sparse Compressed Convolutional Neural Networks," in IEEE Open Journal of Circuits and Systems, vol. 2, pp. 131-143, 2021, doi: 10.1109/OJCAS.2020.3041685. (Year: 2021).*

Y. Kim et al., "Low-Overhead Compressibility Prediction for High-Performance Lossless Data Compression," in IEEE Access, vol. 8, pp. 37105-37123, 2020, doi: 10.1109/ACCESS.2020.2975929. (Year: 2020).*

Coughlin, Tom, "175 Zettabytes By 2025", Enterprise Tech, Nov. 27, 2018, 5 pages.

Ibm, "Compressed volumes", available online at <https://www.ibm.com/docs/en/spectrumvirtualsoftw/7.8.1?topic=volume>, Mar. 8, 2021, 6 pages.

Jayasankar et al., "A survey on data compression techniques: From the perspective of data quality, coding schemes, data type and applications", vol. 33, Issue 2, Feb. 2021, pp. 119-140.

Posey, "What are Backup Deduplication and Compression?", Oct. 28, 2020, 7 pages.

Stamford, Conn, "Gartner Forecasts Worldwide IT Spending to Grow 6.2% in 2021", Jan. 25, 2021, 3 pages.

* cited by examiner

DATA REDUCTION FOR STORAGE VOLUMES

BACKGROUND

A storage system includes resources to allow the storage system to store data in storage media, which can include a collection of storage devices (a single storage device or multiple storage devices). In some examples, a storage system can include the storage media and other resources, including processing resources and communication resources. In other examples, a storage system can be in the form of a control system (e.g., a storage server) including processing resources and communication resources and that manages storage of data on separate storage media.

BRIEF DESCRIPTION OF THE DRAWINGS

Some implementations of the present disclosure are described with respect to the following figures.

Figure 1:
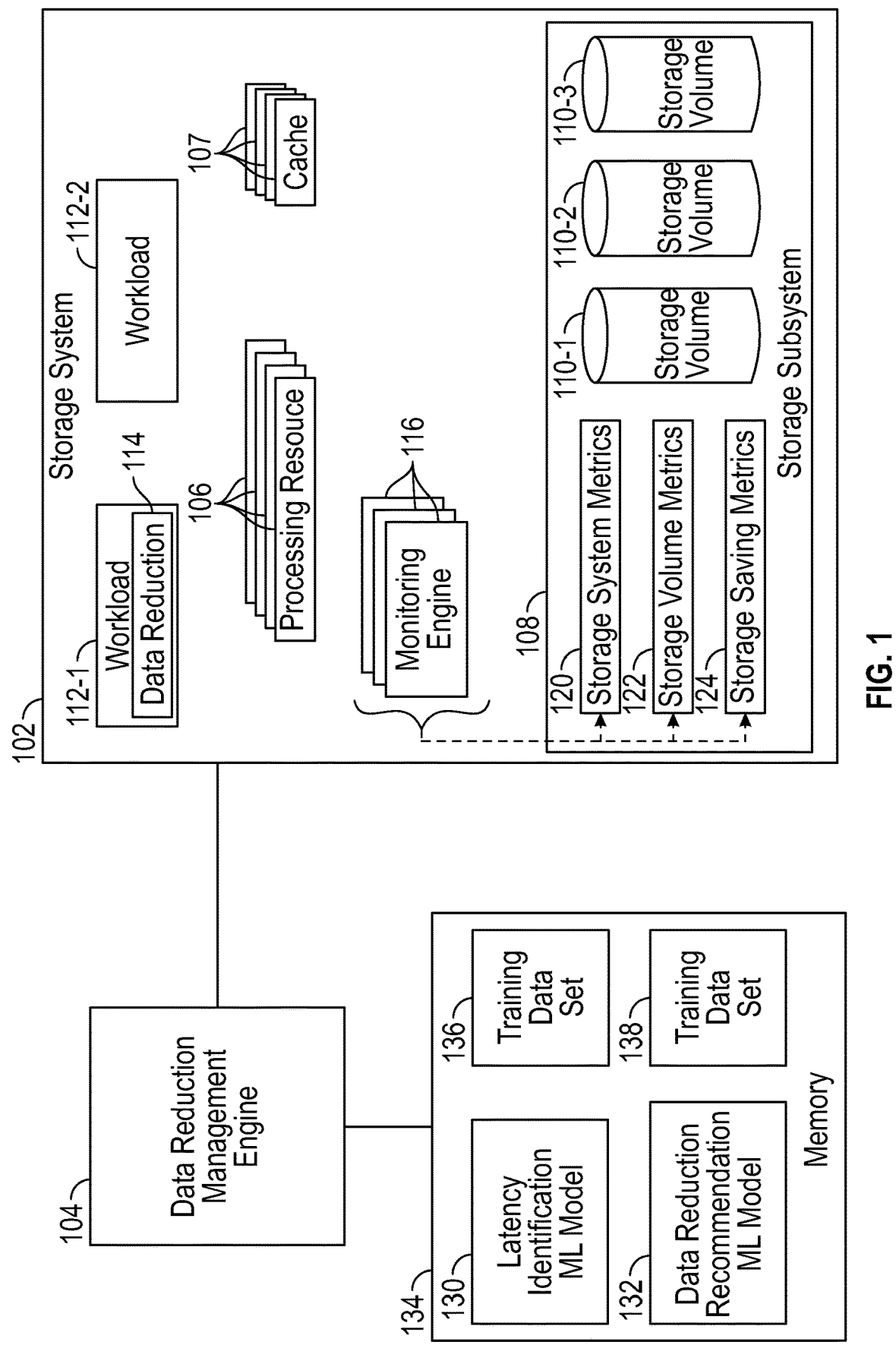
FIG. 1 is a block diagram of an arrangement that includes a storage system and a data reduction management engine according to some examples.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

In the present disclosure, use of the term "a," "an," or "the" is intended to include the plural forms as well, unless the context clearly indicates otherwise. Also, the term "includes," "including," "comprises," "comprising," "have," or "having" when used in this disclosure specifies the presence of the stated elements, but do not preclude the presence or addition of other elements.

Various different types of workloads can be performed at a storage system. The different workloads can compete for resources of the storage system, leading to resource contention that can adversely affect the performance of some workloads.

A "workload" can refer to any collection of activities performed by an entity (e.g., machine-readable instructions or hardware) in the storage system.

Multiple workloads running in a storage system can overload shared resources of the storage system. A first workload can adversely affect the performance of a second workload in the storage system in scenarios where resource usage by the first workload prevents the second workload from executing or causes the second workload to execute more slowly. The shared resources can include physical resources such as processing resources (e.g., processors, cores of processors, etc.), input/output (I/O) resources (e.g., resources such as an I/O controller that support I/O operations, such read operations and write operations), communication resources (e.g., network interface controllers, switches or routers, etc.), memory resources (e.g., memory devices such as dynamic random access memory. (DRAM) devices, static random access memory (SRAM) devices, flash memory devices, etc.), and so forth.

Shared resources can also include logical resources, such as virtual machines, virtual processors, virtual communication devices, and so forth, and/or program resources, such as device drivers, operating system (OS) resources, and so forth.

Data reduction may be applied by some workloads performed on storage volumes stored by a storage system. A "storage volume" can refer to a logical container or other construct into which data can be added, such as by write operations. Data can also be retrieved from a storage volume in read operations.

Examples of data reduction that can be performed on data can include data compression and/or data deduplication. Data compression can refer to encoding or otherwise transforming data such that the data is potentially reduced in size, i.e., the compressed data has a size that is potentially smaller than the size of the uncompressed data. Examples of the compression techniques include Lempel-Ziv (LZ) compression, run-length encoding, dictionary coding, and so forth.

Data deduplication refers to removing duplicate data portions that appear in data. For example, input data may be divided into data chunks. A deduplication process can identify data chunks that have been previously stored by a storage system—the identified data chunks are duplicative data chunks since the storage system already stores the data chunks. The deduplication process may avoid storing the identified duplicative data chunks again at the storage system. Instead of storing the duplicative data chunks, the deduplication process can instead store references to the previously stored data chunks. The deduplicated data (e.g., a deduplicated file, a deduplicated object, etc.) can contain a collection of data chunks and references, where the references are to stored data chunks and are produced by the deduplication process. A "reference" can be a pointer or any other indication of a storage location to a data chunk.

More generally, data reduction applied on data refers to any process that reduces the amount of data stored in a storage system, in response to received input data ("raw data") to store in the storage system.

Performing data reduction can be resource intensive. For example, data reduction can consume processing resources. Data compression applies data encoding that may take some amount of time to execute, especially if the input data is large. Data deduplication can involve dividing input data into data chunks, calculating signature values (e.g., hash values) based on the data chunks, comparing the signature values to a collection of signature values representing data chunks already stored by a storage system, and identifying data chunks for the input data with signature values that match the collection of signature values as duplicative data chunks.

The amount of storage savings that can be accomplished by applying data reduction can depend upon the type of data on which the data reduction is applied. For example, certain types of data are more compressible than other types of data. The effectiveness of data compression can be represented by a compression ratio, which is the ratio of the size of the uncompressed data to the size of the compressed data. The higher the data compression ratio, the more effective the data compression. In other examples, other measures of the effectiveness of data compression can be used.

The effectiveness of data deduplication depends on the amount of duplicative data that can be removed by the application of the data deduplication. Data deduplication is more effective if the deduplication removes more duplicative data chunks, for example.

If a large quantity of workloads is executed on storage volumes stored by a storage system, it can be difficult for an administrator to determine whether or not data reduction applied by the workloads is effective. Ineffective application of data reduction for storage volumes is wasteful of resources of the storage system, which can slow down other workloads. The administrator may observe that the storage system is experiencing high latency ("latency" can refer to an amount of time from when a workload is started to completion of the workload), but the administrator may not have any insights into which workloads are making ineffective use of the resources of the storage system, such as due to ineffective application of data reduction.

In accordance with some implementations of the present disclosure, a system can identify, such as from multiple storage systems, a storage system in which contention for a resource of the storage system is present, and can determine that a collection of workloads (a single workload or multiple workloads) that employ data reduction is consuming the resource. A collection of workloads that includes a single workload or multiple workloads can also be referred to as a "workload collection." The system identifies relative contributions to consumption of the resource attributable to storage volumes in the storage system, where the workload collection that employs the data reduction is performed on data of the storage volumes. The system determines whether storage space savings due to application of the data reduction for a given storage volume of the storage volumes satisfy a criterion, and in response to determining that the storage space savings for the given storage volume do not satisfy the criterion, indicates that data reduction is not to be applied for the given storage volume.

FIG. 1 is a block diagram of an example arrangement that includes a storage system 102 and a data reduction management engine 104 according to some implementations of the present disclosure. Although FIG. 1 shows the data reduction management engine 104 as being separate from the storage system 102, it is noted that in other examples, the data reduction management engine 104 can be part of the storage system 102. If the data reduction management engine 104 is separate from the storage system 102, then the data reduction management engine 104 can be coupled over a network or other link to the storage system 102.

As used here, an "engine" can refer to one or more hardware processing circuits, which can include any or some combination of a microprocessor, a core of a multi-core microprocessor, a microcontroller, a programmable integrated circuit, a programmable gate array, or another hardware processing circuit. Alternatively, an "engine" can refer to a combination of one or more hardware processing circuits and machine-readable instructions (software and/or firmware) executable on the one or more hardware processing circuits.

The storage system 102 includes processing resources 106, which can include any or some combination of the following: processors, cores of multi-core processors, microcontrollers, digital signal processors, programmable integrated circuit devices, programmable gate arrays, virtual entities such as virtual machines, virtual processors, and so forth. The processing resources 106 of the storage system 102 can be part of a single computing node or can be included in multiple computing nodes.

Other types of resources can also be included in the storage system 102, including memory resources such as cache memories 107. A cache memory is implemented with one or more memory devices, and can store data for a respective processing resource. Further types of resources include I/O resources, program resources, and so forth.

In examples according to FIG. 1, the storage system 102 includes a storage subsystem 108, which can include a collection of storage devices (a single storage device or multiple storage devices). Examples of storage devices include disk-based storage devices, solid state drives, and so forth.

In other examples, the storage subsystem 108 can be separate from the storage system 102, but the storage subsystem 108 is accessible by the storage system 102.

The storage subsystem 108 stores various storage volumes 110-1, 110-2, 110-3, etc., which contain data on which workloads (e.g., 112-1, 112-2, etc.) executing on the processing resources 106 are performed. A workload can be performed on data in one or more storage volumes. Conversely, one or more workloads can be applied on data in a storage volume. The workloads are initiated by requesters, which can be remote requesters that communicate with the storage system 102 over a network, or requesters within the storage system 102. A "requester" can refer to a user, a program, or a machine that can make requests to perform operations (e.g., read operations, write operations, etc.) on data stored in the storage volumes of the storage subsystem 108.

Although specific quantities of workloads 112-1, 112-2 and storage volumes 110-1, 110-2, 110-3 are depicted in FIG. 1, in other examples, there may be different quantities of workloads and/or storage volumes.

In the example of FIG. 1, the workload 112-1 applies data reduction 114 on data in a respective storage volume (e.g., 110-1). The workload 112-2 does not apply data reduction on data in a respective storage volume (e.g., 110-3). In such examples, the storage volume 110-1 is referred to as a "thick" storage volume, since data reduction can be applied to achieve a beneficial data reduction ratio when reducing the amount of data stored in the storage volume 110-1 (note that it is possible that a workload performed on a thick storage volume does not apply data reduction). The storage volume 110-2 is referred to as a "non-thick" storage volume, since no data reduction is applied on data stored in the storage volume 110-2.

The data reduction 114 can include data compression and/or data deduplication, for example. For a write operation performed by the workload 112-1, the data reduction 114 can perform data reduction on write data to produce reduced data that is written to a corresponding storage volume(s) 110. "Reduced" data can refer to compressed data and/or deduplicated data.

When reduced data is read from the storage volume 110-1 by the workload 112-1, the data reduction can be reversed (e.g., data can be decompressed and/or data deduplication can be reversed, such as by replacing references to data chunks in the deduplicated data with the actual data chunks).

The storage system 102 includes a collection of monitoring engines 116 (a single monitoring engine or multiple monitoring engines) to collect various performance-related metrics relating to data operations executing in the storage system 102. Examples of performance-related metrics that can be collected include a usage metric of a processing resource 106 (e.g., what percentage of the processing resource is utilized), a latency metric relating to a latency associated with execution of a workload, a cache related metric relating to usage of the cache memories 107 in the storage system 102 (e.g., cache hit rates and/or cache miss rates), and so forth.

The performance-related metrics collected by the collection of monitoring engines 116 can include performance-related metrics relating to the storage system 102 overall, as well as performance-related metrics relating to individual storage volumes.

A performance-related metric relating to the storage system 102 overall can indicate an aggregate utilization of a processing resource 106 for workloads executed on data of the storage volumes 110-1, 110-2, 110-3, an aggregate latency associated with workloads executed on the data of the storage volumes 110-1, 110-2, 110-3, an aggregate cache memory utilization associated with workloads executed on data of the storage volumes 110-1, 110-2, 110-3, and so forth.

A performance-related metric relating to an individual storage volume 110 can indicate a utilization of a processing resource 106 for workload(s) executed on data of the storage volume, a latency associated with workload(s) executed on the data of the individual storage volume, a cache memory utilization associated with workload(s) executed on data of the individual storage volume, and so forth.

The collection of monitoring engines 116 can store storage system metrics 120 in the storage subsystem 108, and can store storage volume metrics 122 in the storage subsystem 108. The storage system metrics 120 include performance-related metrics relating to the storage system 102 overall, while the storage volume metrics 122 include performance-related metrics relating to each individual storage volume.

In other examples, the collection of monitoring engines 116 can store the storage system metrics 120 and the storage volume metrics 122 in a storage medium that is external of the storage system 102.

The collection of monitoring engines 116 can also store storage saving metrics 124 for the storage volumes 110-1, 110-2, 110-3. For each individual storage volume, the storage saving metrics 124 include a metric that represents an amount of storage savings (reduction in data size) achieved by applying data reduction on the data of the individual storage volume.

The storage system metrics 120, the storage volume metrics 122, and the storage saving metrics 124 can be contained in respective data structures stored in the storage subsystem 108 or a different storage medium. For example, the data structures can be in the form of tables, files, and so forth.

The data reduction management engine 104 can manage whether or not data reduction is to be employed for any of the storage volumes 110-1, 110-2, 110-3. In some examples, the data reduction management engine 104 uses machine learning models, including a latency identification machine learning model 130 (to identify elevated latency in the storage system 102 that is to trigger performing a data reduction recommendation process) and a data reduction recommendation machine learning model 132 to provide, in a data reduction recommendation process triggered by the latency identification machine learning model 130, recommendations regarding whether or not any storage volume 110-1, 110-2, or 110-3 is to be subject to data reduction.

The latency identification machine learning model 130 and the data reduction recommendation machine learning model 132 can be stored in the memory 134, which can be implemented using a collection of memory devices (a single memory device or multiple memory devices). The memory 134 can be external of the storage system 102, or can be part of the storage system 102.

Although FIG. 1 shows an example in which the latency identification machine learning model 130 and the data reduction recommendation machine learning model 132 are separate machine learning models, in other examples, the latency identification machine learning model 130 and the data reduction recommendation machine learning model 132 can be integrated into a single machine learning model. Alternatively, the latency identification machine learning model 130 and the data reduction recommendation machine learning model 132 can be divided into more than two machine learning models.

Examples of the latency identification machine learning model 130 and the data reduction recommendation machine learning model 132 can include any or some combination of: a boosted trees regression model, a distance-based clustering model, a glass box local weighted regression model, and so forth.

The latency identification machine learning model 130 can be trained using a training data set 136, and the data reduction recommendation machine learning model 132 can be trained using a training data set 138. The training data sets 136 and 138 can be derived based on historical data relating to performance workloads on storage volumes in the storage system 102.

Once trained, the latency identification machine learning model 130 can be applied on the storage system metrics 120 and the storage volume metrics 122 to determine whether or not the storage system 102 is experiencing unacceptably high latency. The storage system 102 is experiencing unexpectedly high latency if the latency experienced by workloads in aggregation exceeds some specified threshold, which may be a dynamically varying threshold or a static threshold. For example, the latencies of the workloads in aggregate can refer to an average of the latencies experienced by the workloads 112-1, 112-2 when operating on data of the storage volumes 110-1, 110-2, 110-3.

Once trained, the data reduction recommendation machine learning model 132 can be used to make a recommendation regarding whether data reduction is to be applied for each individual storage volume (or group of storage volumes). The data reduction recommendation machine learning model 132 can be applied on the storage system metrics 120, the storage volume metrics 122, and the storage saving metrics 124.

The training data sets 136 and 138 can be continually updated as the latency identification machine learning model 130 and the data reduction recommendation machine learning model 132 are applied to produce results. For example, an administrator can analyze outputs produced by the latency identification machine learning model 130 and the data reduction recommendation machine learning model 132, identify that certain outputs are inaccurate, and can update the training data sets 136 and 138 based on such identification to cause retraining of the latency identification machine learning model 130 and/or the data reduction recommendation machine learning model 132 so that future results produced by the latency identification machine learning model 130 and/or the data reduction recommendation machine learning model 132 would be more accurate.

Figure 2:
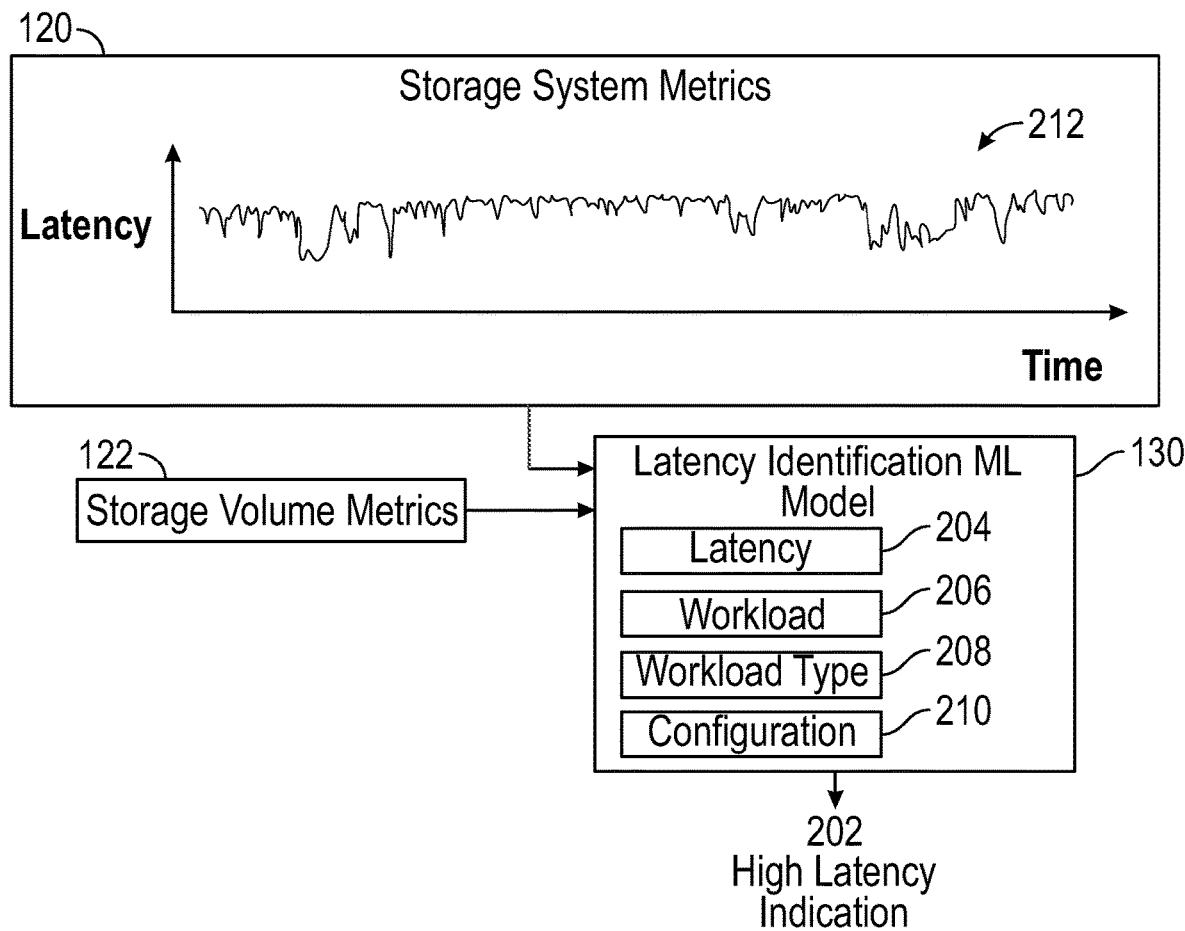
FIG. 2 is a block diagram of a latency identification machine learning model according to some examples.

FIG. 2 is a block diagram of an example of the latency identification machine learning model 130. The latency identification machine learning model 130 uses various features to produce an output based on input data. The input data includes the storage system metrics 120 and the storage volume metrics 122. The output produced by the latency identification machine learning model 130 includes a high latency indication 202 to indicate that the storage system 102 is experiencing high latency.

The features used by the latency identification machine learning model 130 include the following: a latency feature 204, a workload feature 206, a workload type feature 208, and a configuration feature 210. In other examples, the latency identification machine learning model 130 can use additional or alternative features.

A "feature" of a machine learning model is an individual property (or group of properties) that can be assigned different values in input data fed to the machine learning model. The machine learning model uses the feature (or multiple features) to perform a prediction based on the input data.

Values of the various features used by the latency identification machine learning model 130 are included in the storage system metrics 120 and the storage volume metrics 122.

The latency feature 204 refers to a latency experienced by workload(s) when operating on data of a storage volume or multiple storage volumes. The workload feature 206 represents an identifier (e.g., a name or another identifier) of a workload. The workload type feature 208 represents a workload type of a respective workload. The workload type feature 208 can have a first value (a first workload type) to indicate a workload that does not apply data reduction (first workload type), and a different second value (a second workload type) to indicate a workload that applies data reduction (second workload type).

The configuration feature 210 includes a collection of properties representing a configuration of the storage system 102, such as a quantity of the processing resources 106, a storage capacity of the caches 107, a quantity of storage devices in the storage subsystem 108, which storage volumes are thick storage volumes and which are non-thick storage volumes, and so forth. Values for the configuration feature 210 can be included in the storage system metrics 120 or the storage volume metrics 122, or in a separate information set.

In the example of FIG. 2, the storage system metrics 120 include latency values as a function of time, as represented by a graph 212. The latency values represented by the graph 212 represent the latency experienced by the workloads in the system when operating on data in the storage subsystem 108.

The storage volume metrics 122 can similarly include latency values as a function of time, which represent the latency experienced by workload(s) operating on each individual storage volume.

The storage system metrics 120 and the storage volume metrics 122 can include additional or alternative metrics.

If the latency identification machine learning model 130 determines based on the input data (including the storage system metrics 120 and the storage volume metrics 122) that the storage system 102 is experiencing high latency, the high latency indication 202 is output by the latency identification machine learning model 130 (e.g., a high latency indicator such as a flag is set to a first value). On the other hand, if the latency identification machine learning model 130 determines based on the input data that the storage system 102 is not experiencing high latency, then the latency identification machine learning model 130 does not output the high latency indication 202 (e.g., the high latency indicator is set to a second value).

The input data (including the storage system metrics 120 and the storage volume metrics 122) provided to the latency identification machine learning model 130 can be for a specified time interval of a predefined time duration. In some examples, the latency identification machine learning model 130 can be invoked every specified time interval to determine whether the storage system 102 is experiencing high latency in the time interval.

Note that a computing environment (e.g., a cloud environment, a data center, etc.) can include multiple storage systems. The latency identification machine learning model 130 is applied on input data relating to each of the multiple storage systems to identify which storage system is experiencing high latency.

To train the latency identification machine learning model 130, the training data set 136 includes multiple collections (e.g., vectors) of the features 204, 206, 208, and 210, where each collection of the features 204, 206, 208, and 210 can be assigned a high latency label (which is set to a first value to indicate high latency and a second value to indicate not high latency). The labels may be assigned by a human user, a program, or a machine. Training the latency identification machine learning model 130 using a training data set that is labeled is referred to as supervised machine learning. In other examples, the latency identification machine learning model 130 can be trained using unsupervised machine learning, which is learning by the latency identification machine learning model 130 based on recognizing patterns in unlabeled data.

Figure 3:
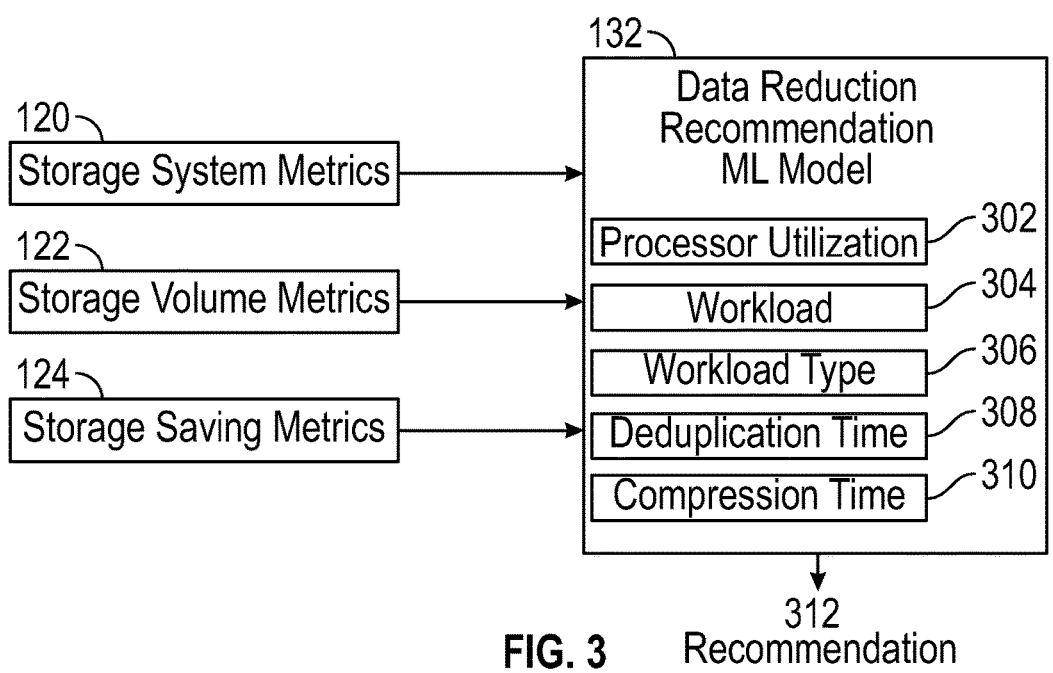
FIG. 3 is a block diagram of a data reduction recommendation machine learning model according to some examples.

FIG. 3 is a block diagram of an example of the data reduction recommendation machine learning model 132. The data reduction recommendation machine learning model 132 uses various features to produce an output based on input data, including the storage system metrics 120, the storage volume metrics 122, and the storage saving metrics 124.

The features used by the data reduction recommendation machine learning model 132 include the following: a processor utilization feature 302, a workload feature 304, a workload type feature 306, a deduplication time feature 308, and a compression time feature 310. In other examples, the data reduction recommendation machine learning model 132 can use additional or alternative features. In other examples, the data reduction recommendation machine learning model 132 can use additional or alternative features.

Values of the various features used by the latency identification machine learning model 130 are included in the storage system metrics 120, the storage volume metrics 122, and the storage saving metrics 124.

The processor utilization feature 302 refers to a utilization of the processing resources 106. In further examples, other resource related features can also be used by the data reduction recommendation machine learning model 132, such as a feature relating to utilization of the cache memories 107, and so forth.

The deduplication time feature 308 refers to a time used in performing deduplication by a workload on data in a storage volume (either already stored in the storage volume or prior to storing in the storage volume). The compression time feature 310 refers to a time used in performing compression by a workload on data in a storage volume. Values of the deduplication time feature 308 and the compression time feature 310 (such as in the storage system metrics 120 and/or the storage volume metrics 122) can be used by the data reduction recommendation machine learning model 132 in determining how much time is involved in performing data deduplication and/or data compression, and whether the storage savings achieved by the data deduplication and/or data compression (as indicated in the storage saving metrics 124) would justify continued use of the corresponding data reduction.

An output produced by the data reduction recommendation machine learning model 132 based on the input data includes a recommendation 312 regarding whether data reduction (e.g., data compression and/or data deduplication) is to be applied on data of each storage volume 110-1, 110-2, 110-3. For example, in response to detecting that the data reduction applied on data of a given storage volume is ineffective, the recommendation 312 provided by the data reduction recommendation machine learning model 132 can indicate that the given storage volume is to be converted from a thick storage volume (for which data reduction can be applied) to a non-thick storage volume (for which data reduction is not applied). Once the given storage volume is converted to the non-thick storage volume, any workload performed on the given storage volume would not apply data reduction on data stored in the give storage volume.

To train the data reduction recommendation machine learning model 132, the training data set 138 includes multiple collections (e.g., vectors) of the features 302, 304, 306, 308, and 310, where each collection of the features 302, 304, 306, 308, and 310 can be assigned a non-thick storage volume label (which is set to a first value to indicate that a storage volume given the collection of the features is to be configured as a non-thick storage volume for which data reduction is not to be applied, and to a second value to indicate that the storage volume given the collection of features is to be configured as a thick storage volume for which data reduction can be applied). The labels may be assigned by a human user, a program, or a machine. Training the data reduction recommendation machine learning model 132 using a training data set that is labeled is referred to as supervised machine learning. In other examples, the data reduction recommendation machine learning model 132 can be trained using unsupervised machine learning, which is learning by the data reduction recommendation machine learning model 132 based on recognizing patterns in unlabeled data.

Figure 4:
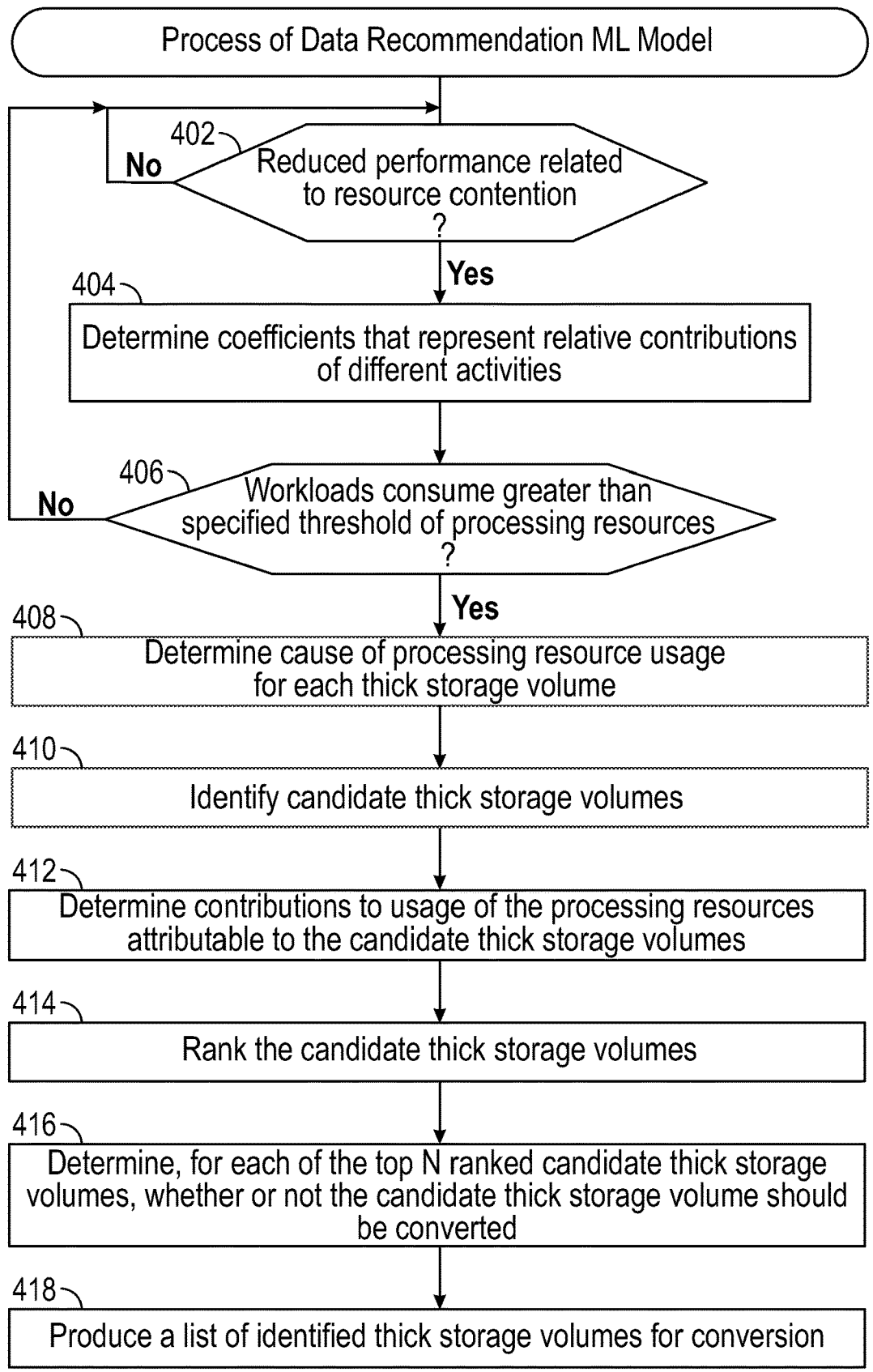
FIG. 4 is a flow diagram of the data reduction recommendation machine learning model according to some examples.

In some examples, once trained, the processing tasks of the data reduction recommendation machine learning model 132 can be according to FIG. 4. The input data (including the storage system metrics 120, the storage volume metrics 122, and the storage saving metrics 124) can be for a specified time interval, which can be the same time interval for which the latency identification machine learning model 130 has identified high latency.

The data reduction recommendation machine learning model 132 determines (at 402), based on the input data (the storage system metrics 120, the storage volume metrics 122, and the storage saving metrics 124), whether a reduced performance (e.g., high latency) of the storage system 102 is related to a resource contention, such as contention for the processing resources 106. This relation between the reduced performance of the storage system and resource contention can be based on values of the processor utilization feature 302 indicating high processing resource usage.

If the reduced performance of the storage system 102 is not related to a resource contention, then the process does not continue.

However, if the reduced performance of the storage system 102 is related to a resource contention, the data reduction recommendation machine learning model 132 determines (at 404) coefficients that represent respective contributions of different activities in the storage system 102. The coefficients can include a first coefficient representing a first portion (e.g., a first percentage) of the processing resources 106 consumed by workloads (e.g., 112-1, 112-2), and a second coefficient representing a second portion (e.g., a second percentage) of the processing resources 106 consumed by background activities. A "background activity" can refer to any activity of the storage system 102 in which metrics are collected by the collection of monitoring engines 116 at the storage system level, without apportioning the metrics to the multiple storage volumes (e.g., 110-1, 110-2, 110-3) of the storage system 102. Examples of background activities include data deduplication, data compression, and any maintenance/management activities performed by the storage system 102. Although data deduplication and data compression are applied to data of storage volumes, in some examples, the collection of monitoring engines 116 do not collect performance-related metrics for data deduplication and data compression at the individual storage volume level.

The coefficients are collected for the purpose of determining whether or not the data reduction recommendation machine learning model 132 is to proceed further with its processing. Based on the first and second coefficients, the data reduction recommendation machine learning model 132 determines (at 406) whether workloads consume greater than some specified threshold of the processing resources 106. For example, the specified threshold can be a threshold percentage (e.g., 30%, 40%, 50%, 60%, 70%, etc.) of the processing resources 106. If the workloads consume greater than some specified threshold of the processing resources 106, then the data reduction recommendation machine learning model 132 proceeds with further processing.

However, if the workloads do not consume greater than the specified threshold of the processing resources 106, then the data reduction recommendation machine learning model 132 does not proceed with further processing since no storage volume level metrics are available for the background activities that consume a relatively large share of the processing resources 106. Since the goal of the processing by the data reduction recommendation machine learning model 132 is to make recommendations regarding whether or not data reduction is to be applied for each storage volume, performing such recommendations when a relatively large share of the processing resources 106 is consumed by background activities would not significantly improve performance of the storage system 102. Stated differently, for the data reduction recommendation machine learning model 132 to produce a recommendation that would significantly improve performance of the storage system 102 (e.g., the latency of the storage system 102 can be reduced by greater than some specified amount), workloads should consume a relatively large share of the processing resources 106.

In examples where the collection of monitoring engines 116 do collect performance-related metrics for data deduplication and data compression at the storage volume level, then tasks 404 and 406 can be omitted.

If the workloads consume greater than some specified threshold of the processing resources 106, the data reduction recommendation machine learning model 132 determines (at 408) the cause of processing resource usage for each thick storage volume in the storage system 102. Note that non-thick storage volumes do not have to be considered since data reduction is not applied for such storage volumes and thus these storage volumes would not be candidates for reducing processing resource load by removing data reduction.

The data reduction recommendation machine learning model 132 uses values of the workload type feature 306 in the storage volume metrics 122 to determine whether workload(s) on a respective thick storage volume is (are) of the first workload type (data reduction is not applied) or the second workload type (data reduction is applied). If the workload(s) on the respective thick storage volume is of the second workload type, then the respective thick storage volume is identified (at 410) as a candidate for conversion to a non-thick storage volume. If there are multiple workloads on the respective thick storage volume that are of mixed workload types (some of which apply data reduction and some of which do not apply data reduction), then the data reduction recommendation machine learning model 132 can determine whether a majority of the workloads (or a quantity of the workloads that exceeds a specified threshold) are of the second workload type, and if so, the data reduction recommendation machine learning model 132 can identify the respective thick storage volume as a candidate for conversion to a non-thick storage volume.

The data reduction recommendation machine learning model 132 then determines (at 412) contributions to usage of the processing resources 106 attributable to the identified candidate thick storage volumes (as identified at 410). The determination (at 412) is based on the metrics included in the storage volume metrics 122, which includes performance-related metrics (such as usage of processing resources) at the storage volume level.

Based on the determined contributions, the data reduction recommendation machine learning model 132 can rank (at 414) the candidate thick storage volumes. A first candidate thick storage volume associated with a larger contribution to usage of the processing resources 106 is ranked higher than a second candidate thick storage volume associated with a smaller contribution to usage of the processing resources 106.

The data reduction recommendation machine learning model 132 can then determine (at 416), for each of the top N (N≥1) ranked candidate thick storage volumes, whether or not the candidate thick storage volume should be converted to a non-thick storage volume.

In other examples, the ranking of storage volumes is not performed, in which case the data reduction recommendation machine learning model 132 can apply task 416 to all of the storage volumes in the storage system 102.

The determination of whether or not a candidate thick storage volume is to be converted to a non-thick storage volume is based on the space savings that can be achieved by application of the data reduction, which can be derived from the storage saving metrics 124. More specifically, the data reduction recommendation machine learning model 132 determines whether the storage space savings due to application of data reduction for the candidate thick storage volume satisfy a criterion, e.g., determining whether a size of data stored in the candidate thick storage volume relative to a size of data of workload(s) applied to the candidate thick storage volume (this can be expressed as a "data reduction ratio" for example) is less than a specified threshold. For example, the data reduction ratio is expressed as a 1:1.x threshold, where "1" represents the size of data stored in the candidate thick storage volume, and "1.x" represents the size of data of workload(s) applied to the candidate thick storage volume. The value of "x" can be specified, such as by a user or another entity. In some examples, x is set to 3, or 4, or 5, or another value.

If 1:1.x is less than a specified threshold, that means that the data reduction reduces the amount of data stored by a sufficient amount to justify application of the data reduction for the candidate thick storage volume. On the other hand, if 1:1.x exceeds (is greater than or equal to) the specified threshold, that means that the data reduction does not reduce the amount of data stored by a sufficient amount to justify application of the data reduction for the candidate thick storage volume.

Based on the determination (at 416), the data reduction recommendation machine learning model 132 produces (at 418) a list of identified thick storage volumes (a single identified thick storage volume or multiple identified thick storage volumes) to be converted to a non-thick storage volume. The list of identified thick storage volumes can be sent by the data reduction management engine 104 to the storage system 102, which can convert each thick storage volume in the list to a non-thick storage volume. Alternatively, the list of identified thick storage volumes can be sent by the data reduction management engine 104 to an administrator, who can reconfigure the identified thick storage volume(s) to non-thick storage volume(s).

Figure 5:
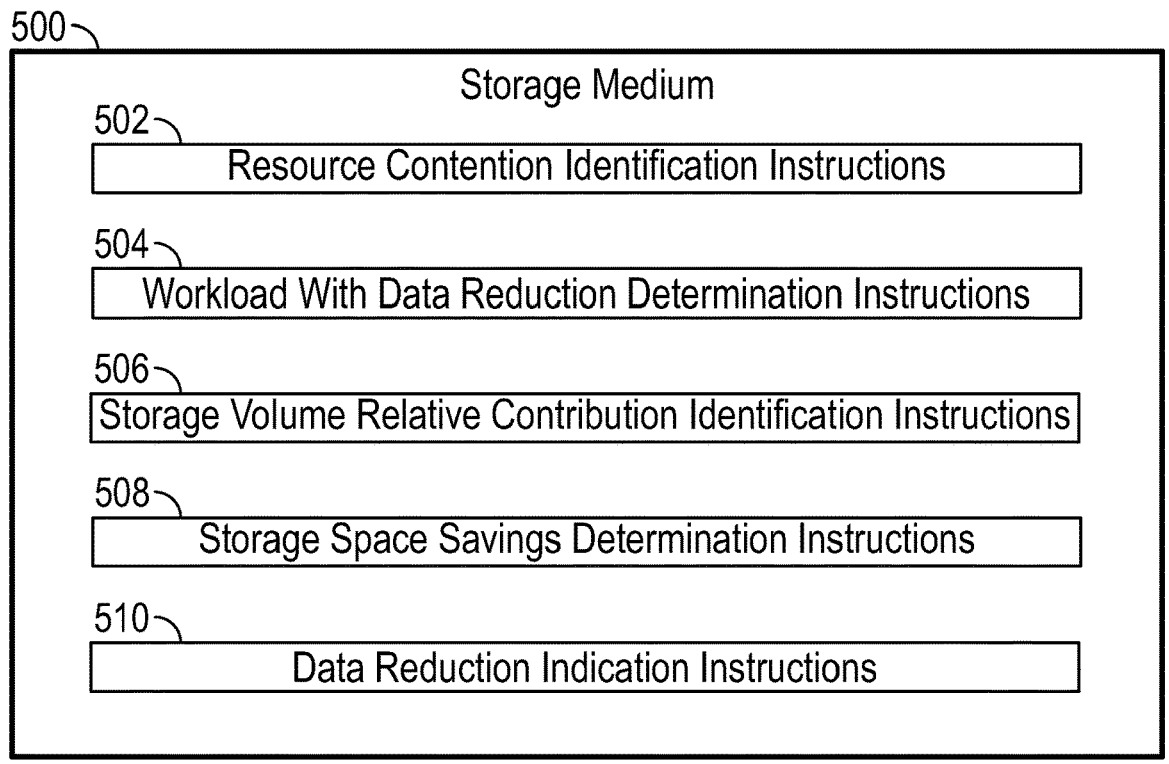
FIG. 5 is a block diagram of a storage medium storing machine-readable instructions according to some examples.

FIG. 5 is a block diagram of a non-transitory machine-readable or computer-readable storage medium 500 storing machine-readable instructions that upon execution cause a computer system to perform various tasks.

The machine-readable instructions include resource contention identification instructions 502 to identify resource contention for a resource in a storage system. In some examples, the resource includes any or some combination of the following: a collection of processing resources, a collection of memory resources, a collection of communication resources, a collection of I/O resources, a collection of program resources, a collection of virtual resources, and so forth.

In some examples, the identification of resource contention for a resource in the storage system can be performed by applying a first machine learning model, e.g., the latency identification machine learning model 130 of FIG. 1, on input data including performance-related metrics for the storage system and for the storage volumes. In some examples, features of the machine learning model include a latency metric (e.g., 204 in FIG. 2), workload information of the collection of workloads (e.g., 206 and 208 of FIG. 2), and configuration information of the storage system (e.g., 210 of FIG. 2).

The machine-readable instructions include workload with data reduction determination instructions 504 to determine that a collection of workloads (or equivalently, "workload collection") that employs data reduction is consuming the resource. The determination can be based on workload information that includes identifiers of workloads and workload types, which can be included in the storage system metrics 120 and the storage volume metrics 122, for example.

The machine-readable instructions include storage volume relative contribution identification instructions 506 to identify relative contributions to consumption of the resource attributable to storage volumes in the storage system. The collection of workloads that employs data reduction is performed on data of the storage volumes.

The machine-readable instructions include storage space savings determination instructions 508 to determine whether storage space savings due to application of the data reduction for a given storage volume of the storage volumes satisfy a criterion. In some examples, the determining of whether the storage space savings satisfy the criterion includes determining whether a size of data stored in the given storage volume relative to a size of data of a workload applied to the given storage volume (e.g., 1:1.x or another data reduction ratio) is less than a specified threshold.

The machine-readable instructions include data reduction indication instructions 510 to, in response to determining that the storage space savings for the given storage volume do not satisfy the criterion, indicate that data reduction is not to be applied for the given storage volume. In some examples, the indicating that data reduction is not to be applied for the given storage volume includes converting the given storage volume from a first type storage volume for which data reduction can be applied to a second type storage volume for which data reduction is not to be applied.

In some examples, the determining that the collection of workloads that employs data reduction is consuming the resource, the identifying of the relative contributions to the consumption of the resource attributable to the storage volumes in the storage system, and the determining of whether the storage space savings satisfy the criterion are performed based on application of a second machine learning model, e.g., the data reduction recommendation machine learning model 132 of FIG. 1. The features of the second machine learning model include a resource utilization metric (e.g., 302 in FIG. 3), workload information of the collection of workloads (e.g., 304 and 306 in FIG. 3), and time spent in applying the data reduction (e.g., 308 and 310 in FIG. 3).

In some examples, in response to determining that the storage space savings due to application of the data reduction for the given storage volume satisfy the criterion, the machine-readable instructions allow data reduction to continue to be applied for the given storage volume when storing data to the given storage volume.

In some examples, the machine-readable instructions rank the storage volumes according to the relative contributions to consumption of the resource attributable to the storage volumes. The given storage volume for which the indication is provided is a higher ranked storage volume with respect to another storage volume of the storage volumes according to the ranking.

In some examples, the machine-readable instructions determine whether workloads including the collection of workloads consume greater than a specified threshold amount of the resource, where the identifying of the relative contributions, the determining of whether the storage space savings satisfy the criterion, and the indicating are performed in response to determining that the workloads including the collection of workloads consume greater than the specified threshold amount of the resource.

Figure 6:
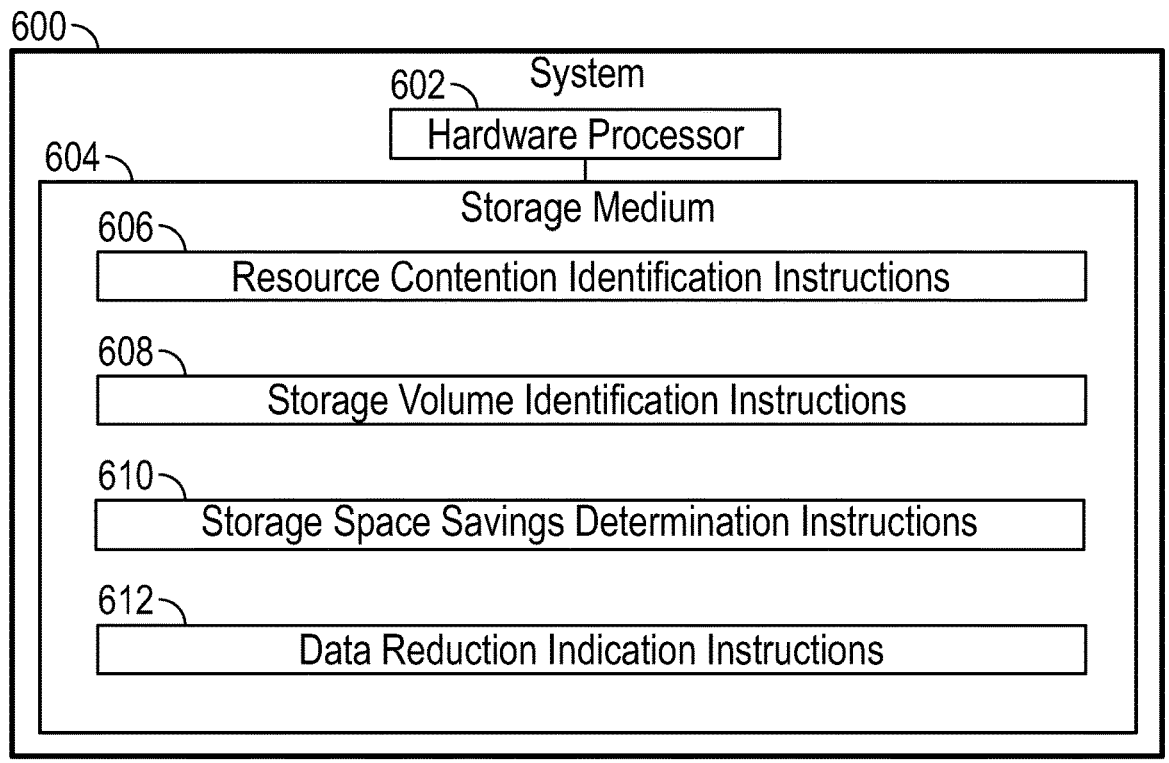
FIG. 6 is a block diagram of a system according to some examples.

FIG. 6 is a block diagram of a system 600 that includes a hardware processor 602 (or multiple hardware processors). A hardware processor can include a microprocessor, a core of a multi-core microprocessor, a microcontroller, a programmable integrated circuit, a programmable gate array, or another hardware processing circuit.

The system 600 includes a storage medium 604 storing machine-readable instructions that are executable on the hardware processor 602 to perform various tasks. Machine-readable instructions executable on a hardware processor can refer to the instructions executable on a single hardware processor or the instructions executable on multiple hardware processors.

The machine-readable instructions in the storage medium 604 include resource contention identification instructions 606 to identify resource contention for a resource in a storage system.

The machine-readable instructions in the storage medium 604 include storage volume identification instructions 608 to identify storage volumes, in the storage system, for which workloads apply data reduction. In some examples, the identified storage volumes are thick storage volumes that are distinct from non-thick storage volumes for which the data reduction is disallowed.

The machine-readable instructions in the storage medium 604 include storage space savings determination instructions 610 to determine, based on application of a machine learning model to input data that includes performance-related metrics relating to the storage system and to individual storage volumes, whether a storage space savings due to application of the data reduction for a given storage volume of the identified storage volumes satisfy a criterion.

The machine-readable instructions in the storage medium 604 include data reduction indication instructions 612 to, in response to determining that the storage space savings for the given storage volume do not satisfy the criterion, indicate that data reduction is not to be applied for the given storage volume.

In some examples, the identifying of the storage volumes for which workloads apply the data reduction is from a larger group of storage volumes including a further storage volume for which the data reduction is not applied.

Figure 7:
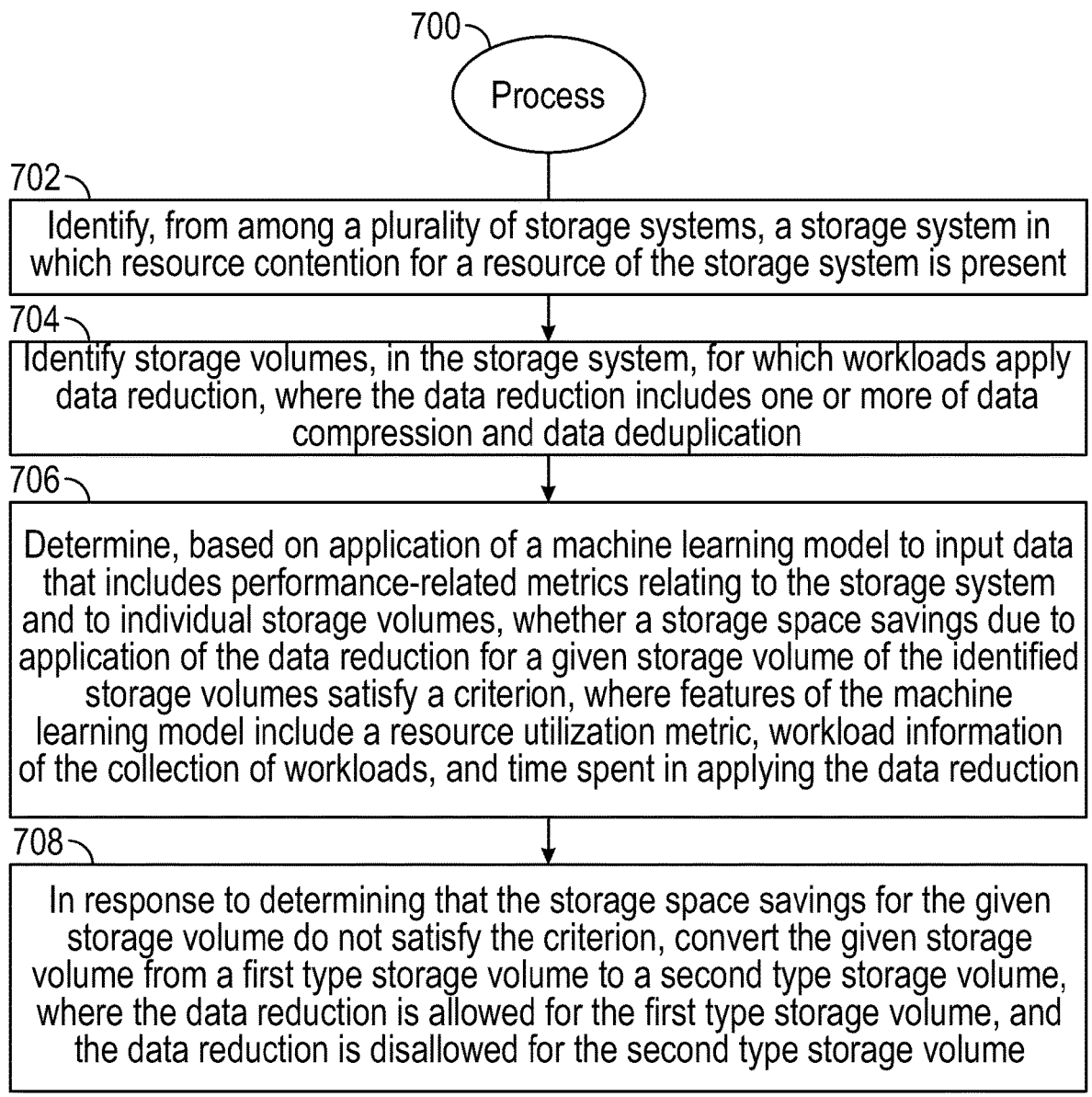
FIG. 7 is a flow diagram of a process according to some examples.

FIG. 7 is a flow diagram of a process 700, which can be performed by the data reduction management engine 104, for example.

The process 700 includes identifying (at 702), from among a plurality of storage systems, a storage system in which resource contention for a resource of the storage system is present.

The process 700 includes identifying (at 704) storage volumes, in the storage system, for which workloads apply data reduction, where the data reduction includes one or more of data compression and data deduplication.

The process 700 includes determining (at 706), based on application of a machine learning model to input data that includes performance-related metrics relating to the storage system and to individual storage volumes, whether a storage space savings due to application of the data reduction for a given storage volume of the identified storage volumes satisfy a criterion, where features of the machine learning model include a resource utilization metric, workload information of the collection of workloads, and time spent in applying the data reduction.

The process 700 includes, in response to determining that the storage space savings for the given storage volume do not satisfy the criterion, converting (at 708) the given storage volume from a first type storage volume to a second type storage volume, where the data reduction is allowed for the first type storage volume, and the data reduction is disallowed for the second type storage volume.

A storage medium (e.g., 500 in FIG. 5 or 604 in FIG. 6) can include any or some combination of the following: a semiconductor memory device such as a dynamic or static random access memory (a DRAM or SRAM), an erasable and programmable read-only memory (EPROM), an electrically erasable and programmable read-only memory (EEPROM) and flash memory; a magnetic disk such as a fixed, floppy and removable disk; another magnetic medium including tape; an optical medium such as a compact disk (CD) or a digital video disk (DVD); or another type of storage device. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

What is claimed is:

1. A non-transitory machine-readable storage medium comprising instructions that upon execution cause a computer system to:
   identify resource contention for a resource in a storage system;
   determine that a workload collection that employs data reduction is consuming the resource;
   identify contributions to consumption of the resource attributable to storage volumes in the storage system, wherein the workload collection that employs the data reduction is performed on data of the storage volumes, wherein the identifying of the contributions comprises:
      identifying a first contribution to consumption of the resource attributable to a first storage volume of the storage volumes, and
      identifying a second contribution to consumption of the resource attributable to a second storage volume of the storage volumes;
   determine whether storage space savings due to application of the data reduction for a given storage volume of the storage volumes satisfy a criterion; and
   in response to determining that the storage space savings for the given storage volume do not satisfy the criterion, convert the given storage volume from a first type storage volume for which data reduction can be applied to a second type storage volume for which data reduction is not to be applied.

2. The non-transitory machine-readable storage medium of claim 1, wherein the instructions upon execution cause the computer system to:
   rank the storage volumes according to the contributions to consumption of the resource attributable to the storage volumes,
   wherein the given storage volume is a higher ranked storage volume than another storage volume of the storage volumes according to the ranking.

3. The non-transitory machine-readable storage medium of claim 1, wherein the data reduction comprises one or more of data compression or data deduplication.

4. The non-transitory machine-readable storage medium of claim 1, wherein the instructions upon execution cause the computer system to:
   determine whether workloads including one or more workloads of the workload collection consume greater than a specified threshold amount of the resource,
   wherein the identifying of the contributions, the determining of whether the storage space savings satisfy the criterion, and the converting are performed in response to determining that the workloads including the one or more workloads of the workload collection consume greater than the specified threshold amount of the resource.

5. The non-transitory machine-readable storage medium of claim 1, wherein the determining of whether the storage space savings satisfy the criterion comprises determining whether a size of data stored in the given storage volume relative to a size of data of a workload applied to the given storage volume is less than a specified threshold.

6. The non-transitory machine-readable storage medium of claim 1, wherein the instructions upon execution cause the computer system to:
   in response to determining that the storage space savings satisfy the criterion, allow the data reduction to continue to be applied for the given storage volume when storing data to the given storage volume.

7. The non-transitory machine-readable storage medium of claim 1, wherein the identifying the resource contention for the resource in the storage system comprises applying a machine learning model on input data comprising performance-related metrics for the storage system and for the storage volumes.

8. The non-transitory machine-readable storage medium of claim 7, wherein features of the machine learning model comprise a latency metric, workload information of the workload collection, and configuration information of the storage system.

9. The non-transitory machine-readable storage medium of claim 8, wherein the workload information identifies each respective workload of the workload collection and a type of the respective workload.

10. The non-transitory machine-readable storage medium of claim 1, wherein the determining that the workload collection that employs data reduction is consuming the resource, the identifying of the contributions to the consumption of the resource attributable to the storage volumes in the storage system, and the determining of whether the storage space savings satisfy the criterion are performed based on application of a machine learning model.

11. The non-transitory machine-readable storage medium of claim 10, wherein features of the machine learning model comprise a resource utilization metric, workload information of the workload collection, and time spent in applying the data reduction.

12. The non-transitory machine-readable storage medium of claim 10, wherein the machine learning model is applied on input data comprising performance-related metrics for the storage system, performance-related metrics for the storage volumes, and storage saving metrics related to application of the data reduction.

13. The non-transitory machine-readable storage medium of claim 1, wherein the storage volumes are part of a subset of storage volumes, and wherein the instructions upon execution cause the computer system to:
   determine, for a set of candidate storage volumes, a cause of resource usage for each candidate storage volume of the set of candidate storage volumes; and
   identify, based on the determined cause of resource usage, the subset of storage volumes.

14. The non-transitory machine-readable storage medium of claim 13, wherein the instructions upon execution cause the computer system to:

include a given candidate storage volume of the set of candidate storage volumes in the subset of storage volumes responsive to determining that the cause of resource usage for the given candidate storage volume is from a workload that applies the data reduction.

15. A system comprising:

a hardware processor; and a non-transitory storage medium storing instructions executable on the hardware processor to:

identify resource contention for a resource in a storage system;

identify storage volumes, in the storage system, for which workloads apply data reduction;

determine, based on application of a machine learning model to input data, whether storage space savings due to application of the data reduction for a given storage volume of the identified storage volumes satisfy a criterion, wherein the input data comprises performance-related metrics relating to the storage system and to individual storage volumes; and based on determining that the storage space savings for the given storage volume do not satisfy the criterion, convert the given storage volume from a first type storage volume for which data reduction can be applied to a second type storage volume for which data reduction is not to be applied.

16. The system of claim 15, wherein the identifying of the storage volumes for which workloads apply the data reduction is from a larger group of storage volumes including a further storage volume for which the data reduction is not applied.

17. The system of claim 15, wherein features of the machine learning model comprise a resource utilization metric, workload information of the workloads, and time spent in applying the data reduction.

18. A method of a system comprising a hardware processor, comprising:

identifying, from among a plurality of storage systems, a storage system in which resource contention for a resource of the storage system is present;

identifying storage volumes, in the storage system, for which workloads apply data reduction, wherein the data reduction comprises one or more of data compression and data deduplication;

determining, based on application of a machine learning model to input data, whether storage space savings due to application of the data reduction for a given storage volume of the identified storage volumes satisfy a criterion, wherein features of the machine learning model comprise a resource utilization metric, workload information of the workloads, and time spent in applying the data reduction, and the input data comprises performance-related metrics relating to the storage system and to individual storage volumes; and based on determining that the storage space savings for the given storage volume do not satisfy the criterion, converting, by the system, the given storage volume from a first type storage volume to a second type storage volume, wherein the data reduction is allowed for the first type storage volume, and the data reduction is disallowed for the second type storage volume.

19. The method of claim 18, wherein the determining of whether the storage space savings satisfy the criterion comprises determining whether a size of data stored in the given storage volume relative to a size of data of a workload applied to the given storage volume is less than a specified threshold.

20. The system of claim 15, wherein the data reduction comprises one or more of data compression or data deduplication.

* * * * *